April 25, 1939.  C. V. JOHNSON  2,156,117

SHOCK STRUT

Filed Sept. 26, 1934

INVENTOR
Carl V. Johnson
BY
ATTORNEY

Patented Apr. 25, 1939

2,156,117

UNITED STATES PATENT OFFICE 2,156,117

SHOCK STRUT

Carl V. Johnson, South Bend, Ind., assignor to Bendix Products Corporation, South Bend, Ind., a corporation of Indiana Application September 26, 1934, Serial No. 745,624

16 Claims. (Cl. 267—64)

This invention relates to shock absorbers and more particularly to those of the strut type adapted for aviation landing gear.

The invention has to do with the improved construction of a shock absorbing strut of the compressed air and hydraulic metering pin and orifice type which is adapted for heavy duty work and also operation in pairs. The structure is also such as to permit its ready installation or removal in a tubular strut socket of a plane to the end that repairs and inspection may be readily made by removal thereof.

Accordingly, an object of the invention is to provide a shock strut for heavy duty and quick mounting and demounting in an inverted strut socket.

A further object of the invention is the provision of a shock strut adapted to operate in pairs, with the compressed gas chambers interconnected.

A still further object of the invention is the provision of an improved check valve for preventing rebound more advantageously located so as to minimize turbulence of metered liquid within the air chamber.

Another object is the provision of a resilient bumper adapted to absorb shock resulting at the end of a compression stroke resulting from unusual landing shocks.

Still another object of the invention relates to the improved construction of a shock strut wherein support of the upper casing is centered around the orifice member, which member is subjected to the greatest pressures by landing shocks.

The above and other objects and novel features of the invention will appear more fully hereinafter from the following detailed description when taken in conjunction with the accompanying drawing. It is expressly understood, however, that the drawing is employed for purposes of illustration only and is not designed as a definition of the limits of the invention, reference being had for this purpose to the appended claims.

In the drawing, wherein like reference numerals indicate like parts:

Figure 4:
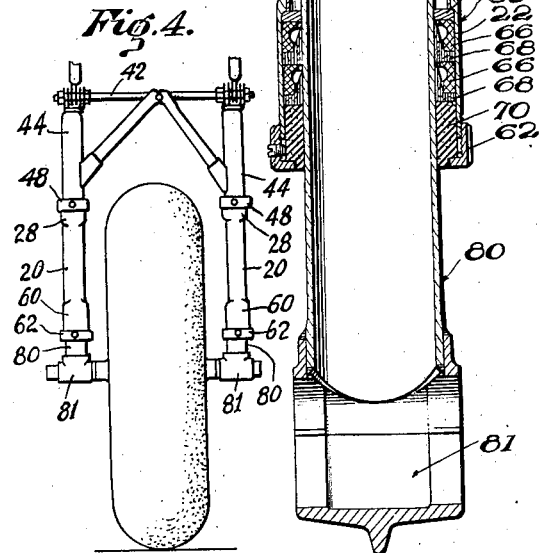

Fig. 4 diagrammatically illustrates the method of pairing struts.

Figure 1:
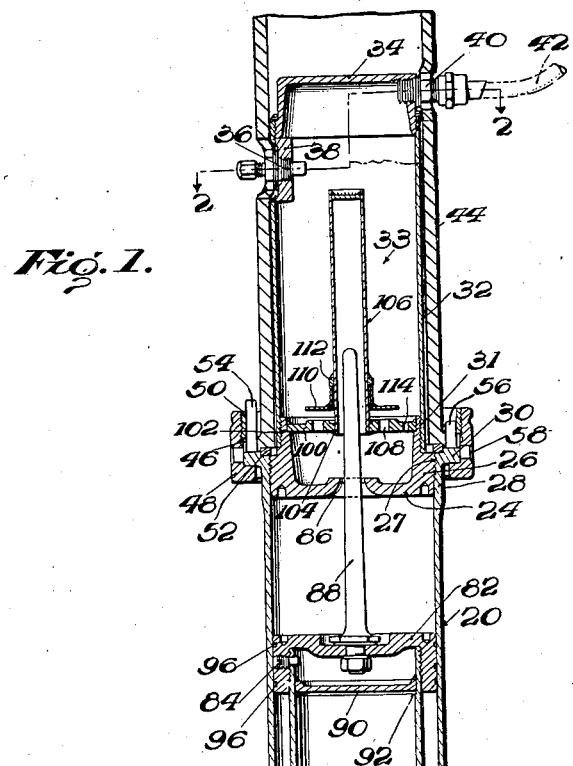
Fig. 1 is a longitudinal section of a shock strut constructed in accordance with the novel features of the invention.
Figure 2:
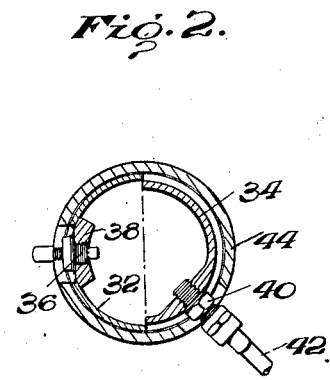
Fig. 2 is a transverse section of Fig. 1 taken on the line 2—2 therein.

Referring to Fig. 1 of the drawing, it will be seen that the strut comprises generally two parts, an upper or stationary fixed part, and a lower recipocating part. The upper part comprises a cylindrical or tubular member 20 carrying a packing chamber 22 at its lower end and an orificed end closure member 24 at its upper end.

As illustrated, the end closure member 24 has a cylindrical flange 26 having a threaded portion 27 screwed into the end of the tubular member 20 adjacent the thickened end 28 and radially outwardly extending flange 30 thereof. The flange 26 also is provided with a reduced diameter threaded portion 31 on which is screwed a cylindrical member 32 extending upwardly and forming an air compression chamber 33, the upper end of which latter member 32 is provided with an end closure cap 34. A filler plug 36 and reinforcement 38 therefor is also preferably provided in the side wall; adjacent the cap 34.

Entering the cap as near the top as practicable is a nipple 40 to which is secured a tube 42 which may connect to an adjacent shock strut, when the same are employed in pairs, so as to equalize the pressures therein.

The upper or stationary part of the strut as above described is adapted for insertion into the open end of a tubular strut such as 44 rigidly secured to the airplane. Such a strut may have a flange 46 which is adapted to engage the flange 30 of the cylindrical member 20 and such engagement is effected by the flanged nut 48 and threaded collar 50 which squeeze the two flanges 46 and 30 together around an intervening alignment or centering collar 52 which may, if desired, be integral with either flange 46 or 30. Suitable pins such as 54 and 56 which pass through slots in the collar 50 and flange 46 prevent relative rotation between these members while the flanged nut 48 is provided with spanner holes 58 to aid in drawing the flanges 30 and 46 tightly together. In practice the collar 50 may be split through the slots to provide two parts so that the collar may be placed above the flange 46.

The lower end of the cylindrical member 20 has an offset portion 60 of greater diameter to house the packing 22, and is threaded exteriorly at the end to receive the end nut 62 having a radially inwardly extending flange adapted to retain the packing. Preferably, the packing comprises an annular retaining ring 64 seated against a shoulder formed by the aforementioned offset; a pair of compression rings 66 acting against annular "L", sectioned packing rings 68 and an end collar 70 engaged by the flange of nut 62.

The packing engages the smooth exterior surface of the piston sleeve 80 of the lower reciprocating part, which part is provided at its lower end with a tubular transverse split socket 81 for engaging an axle or axle carrying member for a landing wheel. On the upper end of the sleeve is positioned a piston 82 in the form of a cap having internal threads engaging external threads on the sleeve 80. The piston is secured against loosening by radial screws 84 which are threaded in the side of the piston or cap and pass through apertures provided therefor in the upper end of the sleeve 80.

To regulate the effective area of the orifice 86 heretofore referred to in the end closure member 24 of cylindrical member 20, a metering pin 88 of chosen contour is secured to the piston as shown and is adapted to reciprocate within the orifice 86, the varying contour thereby varying the effective orifice opening. Immediately below the piston 82 and within the piston sleeve 80 is provided a bulkhead or diaphragm 90 which is preferably seated in a slight shoulder 92 on the inner wall of the sleeve, the purpose of the bulkhead being to prevent leakage of liquid past this point from within the strut, it being understood that the strut is partially filled with a hydraulic damping liquid.

Figure 3:
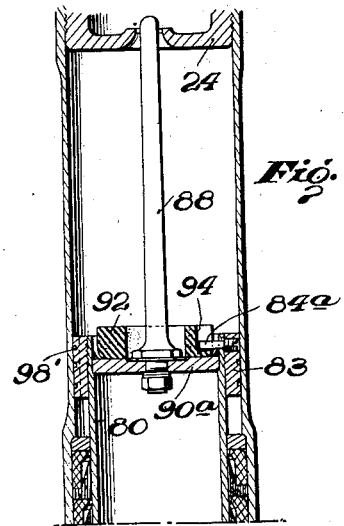
Fig. 3 is a longitudinal section of a portion of the shock strut of Fig. 1 showing several modifications.

As shown in Fig. 3, the piston may be dispensed with and the bulkhead strengthened to carry the metering pin. Such arrangement also provides an annular space between the sleeve 80, bulkhead or diaphragm 90a and pin 88 in which a resilient or rubber doughnut 92 may rest which may in the event of an extreme shock strike the end closure plate 24 to cushion the extreme end of the main shock absorbing stroke. One or more radial pins 84a may project inwardly and provide the dual function of holding the threaded bearing collar 83 in place and engage slots 94 in the piston or doughnut to retain the same. The piston or collar in either modification may have oil grooves such as 96 in Fig. 1, or be provided with one or more elemental grooves 98 to allow free passage of fluid therepast to the packing, or both as may be desired.

In order to prevent rebound immediately after the initial landing shock, the end closure member 24 has positioned a short distance above it, a diaphragm 100 which is supported in an annular internal shoulder 102 in the flange reduced diameter portion 31. The diaphragm has a central orifice 104 in which is secured a tubular housing member 106 closed at its upper end which serves to enclose the metering pin. Ports 108 in the diaphragm cooperate with an annular valve 110 slidably mounted around the housing member 106 and the latter's movement is limited by an annular collar 112 affixed to the housing member, a short distance up from the diaphragm 100. One or more bleed ports 114 are provided in the diaphragm at a point out from under the valve to permit gradual extension of the strut after a shock, it being understood that ports 108 are closed by valve 110 to prevent rebound.

In practice, the strut is filled with liquid above the piston 82 and to a level above the orifice 86 and preferably above the diaphragm 100. The top of the strut is further filled with compressed air or gas to a pressure of 30 to 50 atmospheres depending on the load carried and the cross section of the strut. The initial shock of landing is absorbed by forcing the damping liquid through the orifice 86 to dissipate the energy and through the open valve ports 108 into the top compression chamber. Some of the initial shock of landing may be absorbed by compressing the gas in the chamber above that normally required to sustain the load during taxiing. Such compression would cause rebound, except that the flap valve 110 closes the ports 108 restricting return flow of the liquid to bleed ports 114. Upon taking off, the maximum extension of the strut is governed by the engagement of the piston 80 with the packing retaining ring 64, and the rate of extension is restricted by the same bleed ports 114.

It will thus be seen that a shock strut is provided of novel design adapted for heavy airplane transport use and in pairs, and although but a single embodiment of the invention with varying details has been illustrated and described, it is to be understood that the invention is not limited thereto but may be embodied in other mechanical arrangements and equivalent forms. As many such changes may be made without departing from the spirit of the invention, as will be apparent to those skilled in the art, reference will be had to the appended claims for a definition of the invention.

What is claimed is:

1. A shock strut comprising a diaphragm member having an orifice and a tubular casing member extending downwardly therefrom, a piston adapted to reciprocate in said tubular casing, a chamber secured on top of said diaphragm, and hollow tubing means independent of the strut and extending beyond the upper end of the strut for supporting said strut adjacent said diaphragm.

2. A shock strut comprising a diaphragm member having an orifice, a tubular casing extending downwardly therefrom, a chamber arranged on top of said diaphragm, a piston reciprocable in said casing, and hollow tubular full load supporting means secured to said casing adjacent said diaphragm and extending beyond the end of said chamber.

3. A shock strut comprising a diaphragm member having an orifice, a tubular casing extending downwardly therefrom having a reciprocating piston therein, a chamber extending upwardly from said diaphragm, and hollow tubular full load supporting means for said strut extending beyond the end thereof and secured thereto substantially in the plane of said diaphragm.

4. A shock strut comprising a diaphragm member having a central orifice, a tubular casing extending downwardly therefrom, a chamber above said diaphragm, a piston in said casing carrying a metering pin reciprocable in said orifice, a valve diaphragm above and adjacent said diaphragm and having a central orifice, a housing closed at its upper end secured over said second named orifice and extending into said chamber and adapted to receive said metering pin, port holes in said valve diaphragm, and a valve member slidably mounted on said housing adapted to close said port holes.

5. A shock strut comprising a diaphragm member having a central orifice, a tubular casing extending downwardly therefrom, a chamber above said diaphragm, a piston in said casing carrying a metering pin reciprocal in said orifice, a valve diaphragm above and adjacent said diaphragm having a central orifice, a housing closed at its upper end secured over said second named orifice and extending into said chamber and adapted to receive said metering pin, port holes in said valve diaphragm, a valve member slidably mounted on said housing adapted to close said port holes, and a bleed port in said valve diaphragm outside the sphere of action of said valve member.

6. A shock strut comprising a tubular casing, means to support the casing at its upper end, a diaphragm in its upper end having an orifice, a chamber over said orifice independent of said support means, a piston adapted to reciprocate in said casing, a tubular piston rod secured to said piston and emerging from the bottom of said casing, and packing carried in the lower end of said casing coacting with said piston rod.

7. A shock strut comprising a tubular casing, means to support the casing at its upper end, a diaphragm in its upper end having a central orifice, a chamber over said orifice, a piston adapted to reciprocate in said casing and having a metering pin cooperating with said orifice, a tubular piston rod secured to said piston and emerging from the bottom of said casing, and packing carried in the lower end of said casing coacting with said piston rod.

8. In a shock strut, a tubular support member having at its lower end an outwardly extending flange, a tubular casing member having an outwardly extending flange at its upper end adapted to cooperate with said first named flange, said casing member carrying a main metering orifice member immediately adjacent the upper end, means for absorbing and dissipating shocks and resiliently supporting a load carried by said casing member, and means including a flanged nut for detachably securing said flanges together.

9. In a shock strut, a tubular support member having at its lower end an outwardly extending flange, a tubular casing member having an outwardly extending flange at its upper end adapted to cooperate with said first named flange, said casing member carrying a main metering orifice member immediately adjacent the upper end, means for absorbing and dissipating shocks and resiliently supporting a load carried by said casing member above and below said casing member flange, and means for detachably securing said flanges together.

10. In a shock strut, a diaphragm member having an upwardly extending peripheral flange, a central orifice therein, means for forcing damping liquid through said orifice including a metering pin adapted to reciprocate therein, a port diaphragm secured to the upwardly extending peripheral flange and having an aperture alined with said orifice, and a closed tubular housing for said metering pin to extend into closing said aperture.

11. In a shock strut, a diaphragm member having an upwardly extending peripheral flange, a central orifice therein, means for forcing damping liquid through said orifice including a metering pin adapted to reciprocate therein, a port diaphragm secured to the upwardly extending peripheral flange and having an aperture alined with said orifice, a closed tubular housing for said metering pin to extend into closing said aperture, and valve means controlling a port in said port diaphragm.

12. A pair of shock struts each comprising a diaphragm member having a central orifice, a tubular casing extending downwardly therefrom, a chamber above said diaphragm, a piston in said casing carrying a metering pin reciprocable in said orifice, a valve diaphragm above and adjacent said diaphragm having a central orifice, a housing closed at its upper end secured over said second named orifice and extending into said chamber and adapted to receive said metering pin, port holes in said valve diaphragm, a valve member slidably mounted on said housing adapted to close said port holes, and means connecting each of said chambers together to equalize the pressures therein.

13. A pair of shock struts adapted to operate in unison each comprising a diaphragm member having a central orifice, a chamber above said diaphragm, means for forcing damping liquid through said orifice including a metering pin adapted to reciprocate therein, means closely adjacent said orifice to prevent rebound, and means connecting each of said chambers together to equalize the pressures therein said diaphragm members having means for rigidly connecting them together and said forcing means having means for rigidly connecting them together.

14. A pair of shock struts adapted to operate side by side and in unison each comprising a diaphragm member having a central orifice, a chamber above said diaphragm, means for forcing damping liquid through said orifice including a metering pin adapted to reciprocate therein, means closely adjacent said orifice to prevent rebound, and means connecting each of said chambers together to equalize the pressures therein, said means connected to said chambers at a point remote from said orifice or rebound preventing means said diaphragm members having means for rigidly connecting them together and said forcing means having means for rigidly connecting them together.

15. In a shock strut, a pair of telescopic tubular members, an orificed diaphragm member carried by one of said members, a closure member for the other of said tubular members spaced from the end thereof, said closure member carrying a metering pin adapted to cooperate with said orificed member, an annular resilient member loosely seated on said closure member around said metering pin adapted to engage said orifice member and resiliently limit relative movement between said member, and radial extending means carried by and adjacent the end of the other of said tubular members extending into side recesses in the resilient member for loosely securing the resilient member in place.

16. A pair of shock struts adapted to operate in unison, each comprising telescopic casings and having an orifice diaphragm carried by the upper casing and a metering pin cooperating with the orifice of said diaphragm and carried by the lower casing, and means connecting the upper casings together to equalize the pressures therein, said upper casings having means for rigidly connecting them together and said lower casings having means for rigidly connecting them together.

CARL V. JOHNSON.